US008667158B2

(12) United States Patent
Jin et al.

(10) Patent No.: US 8,667,158 B2
(45) Date of Patent: Mar. 4, 2014

(54) VIDEO SPLITTING AND DISTRIBUTED PLACEMENT SCHEME FOR CLUSTERED VIDEO SERVERS

(75) Inventors: Hai Jin, Wuhan (CN); Xiao Fei Liao, Wuhan (CN); Qiong Hua Hu, Wuhan (CN); Li Ping Pang, Wuhan (CN)

(73) Assignees: Huazhong University of Science & Technology, Wuhan (CN); Samsung Electronics Co., Ltd., Suwon-Si (KR)

( * ) Notice: Subject to any disclaimer, the term of this patent is extended or adjusted under 35 U.S.C. 154(b) by 2116 days.

(21) Appl. No.: 10/763,422

(22) Filed: Jan. 26, 2004

(65) Prior Publication Data

US 2004/0210948 A1    Oct. 21, 2004

(30) Foreign Application Priority Data

Jan. 25, 2003   (CN) .................................. 03 1 18543

(51) Int. Cl.
*G06F 15/16* (2006.01)
(52) U.S. Cl.
USPC ........................................................ 709/231
(58) Field of Classification Search
USPC ........................................................ 709/231
See application file for complete search history.

(56) References Cited

U.S. PATENT DOCUMENTS

| 4,680,630 | A | * | 7/1987 | Field ............................ 348/580 |
| 5,530,557 | A | * | 6/1996 | Asit et al. ..................... 386/125 |
| 5,668,948 | A | * | 9/1997 | Belknap et al. ............... 709/231 |
| 5,884,028 | A | * | 3/1999 | Kindell et al. ................ 709/234 |
| 6,144,375 | A | * | 11/2000 | Jain et al. ..................... 715/500.1 |
| 6,305,019 | B1 | * | 10/2001 | Dyer et al. ...................... 725/91 |
| 6,573,907 | B1 | * | 6/2003 | Madrane ........................ 715/719 |
| 6,591,247 | B2 | * | 7/2003 | Stern ............................... 705/14 |
| 6,675,189 | B2 | * | 1/2004 | Rehg et al. ..................... 718/100 |
| 6,704,790 | B1 | * | 3/2004 | Gopalakrishnan ............ 709/231 |
| 6,782,550 | B1 | * | 8/2004 | Cao ................................. 725/39 |
| 7,143,177 | B1 | * | 11/2006 | Johnson et al. ............... 709/231 |
| 2002/0069420 | A1 | * | 6/2002 | Russell et al. ................. 725/92 |
| 2002/0145702 | A1 | * | 10/2002 | Kato et al. ........................ 352/1 |
| 2003/0118059 | A1 | * | 6/2003 | Sugahara ...................... 370/535 |
| 2003/0236912 | A1 | * | 12/2003 | Klemets et al. .............. 709/236 |

FOREIGN PATENT DOCUMENTS

JP    2002-158974    5/2002

OTHER PUBLICATIONS

"Improving I/O Performance of Multimedia Servers", Halvorsen, Aug. 1, 2001.*
"Owl: A New Multimedia Data Splitting Scheme for Cluster Video Server", Jin et al., 2002.*

(Continued)

*Primary Examiner* — Jerry Dennison
(74) *Attorney, Agent, or Firm* — Staas & Halsey LLP

(57) ABSTRACT

A method of video splitting and distributed placement scheme for clustered video servers including defining a network packet format for the streaming media and the distributed control file formats for the clips; obtaining the information of streaming media files, getting the basic information of streaming media files and accepting the preliminary splitting requirements of users; defining the placement strategy of clips, obtaining the placement requirements configured by users; analyzing the streaming media files and generating the lists of splitting tasks; running the splitting tasks. According to the number of the clips requested by users, the job is to created multi-threads and each thread processes a splitting task; clips transmission and storage. According to the placement strategy of clips, the job is to transfer the clips to the corresponding storage nodes.

25 Claims, 10 Drawing Sheets

(56) References Cited

OTHER PUBLICATIONS

Prashant J. Shenoy, et al. "Efficient Striping Techniques for Multimedia File Server", Proceedings of the 7th International Workshop on Network and Operating System Support for Digital Audio and Video, May 1997, 12 pages.

Prashant J. Shenoy, et al. "Issues in Multimedia Server Design", ACM Computing Surveys, vol. 27, No. 4, Dec. 1995, pp. 636-639.
Korean Notice of Allowance mailed Jan. 20, 2012 issued in corresponding Korean Patent Application No. 10-2004-0004687.

* cited by examiner

FIG. 3

STREAMING MEDIA NETWORK PACKETS:

MEDIA TYPE HEAD
SEQUENCE NUMBER TIME STAMP SYNCHRONOUS SOURCE PAYLOAD

| T | N   | t | SSRC |  |
|---|-----|---|------|--|
| T | N+1 | t | SSRC |  |
| T | N+2 | t | SSRC |  |
| T | N+3 | t | SSRC |  |

MEDIA TYPE HEAD: UNSIGNED SHORT INTEGER WITH 16 BITS
SEQUENCE NUMBER: UNSIGNED SHORT INTEGER WITH 16 BITS
TIME STAMP: UNSIGNED INTEGER WITH 32 BITS
SYNCHRONOUS SOURCE: UNSIGNED INTEGER WITH 32 BITS
PAYLOAD: AN ARRAY CONSISTED OF UNSIGNED CHAR WITH 8 BITS

FIG. 4

```
//the clips' information
typedef struct Clip
{
    //the storage addresses set of the clips and replicas
    Unsigned int (32 bits)      fHost IP [ MAX_REPLICA_NUM ] ;
    //the space size of the clip.
    Unsigned int 32 bits        fFileSize;
    //the start playtime counted in seconds;
    Float 64 bits               fStartTime;
    //the end playtime counted in seconds;
    Float 64 bits               fEndTime;
    //the sequence number of the first network packet of the clip;
    Unsigned int 32 bits        fStartPacketIndex;
    //the sequence number of the last network packet of the clip;
    Unsigned int 32 bits        fEndPacketIndex;
} Clip;

//the splitting task lists of one source file
typedef struct ClipTable
{
    //the space size of one media file;
    Unsigned int (32 bits)      fFileSize;
    //the hot optionof one film;
    int                         fHot;
    //the name length of the source media file;
    Unsigned char (8 bits)      fNameLen;
    //the number of clips of one source media file;
    Unsigned char (8 bits)      fNumber;
    //the name of the source media file;
    Char                        *fName
    //the structure of each list item;
    Clip                        *fIndex;
} ClipTable;
```

FIG. 5

```
b=AS:1383
a=range:npt=0-  46.57500
m-OTHER 0 RTP/AVP 96
b=AS:1383
a=rtpmap:96 MP1S/90000
a=control:trackID=2
```

FIG. 6

| Clip File header |  |
|---|---|
| Header messages of one stream in the clip file | |
| Streaming Media Network Packets | |
| Header messages of another stream in the clip file | |
| Streaming Media Network Packets | |
| | |

FIG. 7

```
typedef struct FileHeader
{
    // Index ID of one clip file
    Unsigned int (16 bits)        fSplit_ID;
    //The version of the current splitting tool
    Unsigned int (32 bits)        fVersion;
    //The time length of the clip
    Float 64 (64 bits)    fMovieDuration
    //The number of the media streams in the clip
    Unsigned int (32 bits)        fNumTracks
    //The average bandwidth of the clip
    Float 64 (64 bits)    fBandWidth;
} File Header
```

FIG. 8

```
typedef struct TrackHeader
{
    //ID of the stream
    Unsigned char (8 bits)        fTrackID;
    //The duration of the stream
    Float (64 bits)        fTrackDuration;
    //The compression ratio of the stream
    Float (64 bits)        fCompressRatio;
    //The start location of the media data of the stream
    Unsigned int (32 bits)        fMediaPosition
} Fileheader
```

FIG. 9

| ID OF THE MEDIA STREAM (UNIT 8) | SERIAL NUMBER (UNIT 32) | PLAYTIME (FLOAT 64) | LENGTH OF THE NETWORK PACKET (UNIT 16) | NETWORK PACKET (UNIT 8[ ]) |
|---|---|---|---|---|

UINT8: UNSIGNED CHAR (8 BITS)      UINT16: UNSIGNED INT (16 BITS)
UINT32: UNSIGNED INT (32 BITS)
FLOAT64: FLOAT (64 BITS)

FIG. 11

```
typedef struct Each_Task_Info

{

//start time of the clip-counted in seconds;
    Float (64 bits)           fStartTime;
    //start Pack sequence number of the clip;
    Unsigned int (32 bits)    fStartPackIndex;
    //Sstart offset of the clip
    Unsigned int (32 bits)    fStartPosition;
    // end offset of the clip
    Unsigned int (32 bits)    fEndPosition;
    // index of the clip
    Unsigned int (32 bits)    fIndex;
    //task finish percentage of the clip;
    Float (64 bits)           fWorkingProcessing;
    //task dispatch start time of the clip
    Time                      fSchedule_Start_Time;
    //total time of finishing the task of the clip. Its unit is second;
    Float (64 bits)           fSchedule_Total_Time;
    //whether the task of the clip is successful or not
    Unsigned char (8 bits)    fSucceed;

} Each_Task_Info;

typedef struct Task_Info

{

//the number of the items in the list
    Unsigned char (8 bits)    fNumber;
    //the handle of the source media file in the list
    int                       fSourceFile
    //all the splitting tasks Each_Task_Info *fIndex [ MAX_SPLIT_NUMBER ] ;

} Task_Info;
```

VIDEO SPLITTING AND DISTRIBUTED PLACEMENT SCHEME FOR CLUSTERED VIDEO SERVERS

CROSS-REFERENCE TO RELATED APPLICATIONS

This application claims the benefit of Chinese Patent Application No. 03118543.6, filed on Jan. 25, 2003, in the Chinese Intellectual Property Office, the disclosure of which is incorporated herein by reference.

BACKGROUND OF THE INVENTION

1. Field of the Invention

The present invention relates to a method of information processing and storage. It involves the fields of parallel and distributed processing and video processing technologies, and a distributed storage method of the clips of source files suitable for cluster video servers.

2. Description of the Related Art

With the development of the broadband network, audio and video encoding technologies, streaming media and rich media are more and more widely used. For these types of applications, one of the most important infrastructures is the video server. In order to meet the practical needs, the video server has high requirements for performance. The streaming media services are always characterized by large data volume and strict real-time requirements. The general single server architecture can only serve dozens of clients due to the bottleneck caused by a CPU, a memory, a network and a hard disk, and is not applicable for streaming media services that are intended for serving a large number of users, while the high performance servers are very expensive.

Due to the high scalability and low cost of clusters, the cluster-based technologies provide a technical foundation for the implementation of video servers. Remarkable characteristics of clusters include the decentralization of storage units, the autonomy of individual nodes and centralized control. Based on these characteristics, the cluster video servers have attracted more and more attention in academic communities and the industry.

One of the key technologies of the cluster video server is to realize the distributed storage of the films. Each movie needs to be split according to some specific methods so that it can be distributed among the storage nodes of a cluster. Hence, it is very important to find a distributed storage method with high efficiency and high availability for the splitting of movies.

There are two typical solutions for the storage of movies. One is based on the playtime of the movies: dividing the movie into several parts with the same time length (P. Shenoy, P. Goyal, and H. M. Vin, "Issues in Multimedia Server Design", ACM Computing Survey, Vol. 27, No. 4, pp.636-639, December 1995). The other is based on the size of the movies: dividing the movie into several parts with the same file size (P. Shenoy and H. M. Vin. "Efficient Striping Techniques for Multimedia File Server", Proceedings of the 7$^{th}$ International Workshop on Network and Operating System Support for Digital Audio and Video (NOSSDAV '97), pp. 25-36, May 1997).

The former one is based on the same time length and the latter is based on the same space. Both of these methods have some problems. It is difficult to realize the splitting strategy based upon the same time. There are two reasons for this. On the one hand, both the compression ratio and storage formats of each media format are totally different. On the other hand, in the files of the same media format, the scene changes among different phases are not predictable so that the storage space of the media data with the same time length is different. Furthermore, this method is not general enough to process completely different media formats. For the splitting strategy based upon one same space size, random access cannot be easily processed. Because it is possible that different media streams in one movie will not be synchronized in some clips, quality problems will result when playing back the movie. Additionally, this method needs synchronous processes of two consecutive clips across two storage nodes. This process decreases the performance of the system processing multiple streams simultaneously. On the other hand, it increases the difficulties of implementing the interface module of the media data in the video servers and the internal communication traffic between control nodes and data nodes.

The implementation of the two methods described above generally includes four modules: one client information obtaining module, one clip files definition module, one module of obtaining streaming media files information and one media files splitting module. The meanings of these modules in the two methods are distinguished. Consider the client information obtaining module, its main function is to obtain the splitting requirements of the clients. In the splitting method based upon time, it obtains the time length of each clip. While in the splitting method based upon space, it obtains the space length of each clip.

SUMMARY OF THE INVENTION

The present invention provides a novel video splitting and allocating scheme for clustered video servers.

In the new video splitting and allocating scheme, both the time-length issue and the space-length issue of each video slice are considered. Simultaneously, distributed allocating schemes to set splintered video slices to different server nodes of clustered video servers, which would be useful for effectively utilizing the parallel processing characteristic are used.

In one aspect of the present invention, there is provided a video splitting and allocating scheme for clustered video servers.

1. The video splitting and allocation scheme for clustered video servers is described below.

Define a structure of a network packet, a structure of a distributed control file, and a structure of a clip file.

Analyze the basic information of a streaming media source file, and process a client requests to obtain a basic splitting requirement defined by the clients request.

Define a split files placement strategy and analyze a clip file allocating requirements defined by the clients.

According to the requirements of the clients, analyze the streaming media source files to construct a splitting task list and the relevant control files.

Create several threads to split the streaming media source files. Each thread is responsible for splitting a media source file.

According to the clip placement strategy, distribute the splintered clip files to the relevant storage server nodes.

2. The above video splitting and allocation scheme for clustered video servers has the following characteristics:

The structure of the network packet for the media streaming service, which complies with the form of the main part of the streaming media data message in the international real-time transmission protocol, including the media type header, serial number, time stamp, synchronous signal and main media data.

The streaming media source file information capture procedure includes Index file and SDP file. The Index file includes the transmitting task list, the file name of the source video, the storage space of the source video, the time length of the source video, the clip file number of the source video, and the hot spot of the source video. The SDP file includes the media type, the number of streams included in the source video, the time length of the source video and the ID of the streaming session.

The procedure for defining the structure of clip files, includes the header of clip files, the information header of media streams and the network packet of the media streaming service.

The course for analyzing the information of media source file, analyzes the number of logical time units in the media source files, and obtains the time information of the header and the number of the media stream for each logic time unit. It loops until all the logic time units are finished to get the total playback duration, the storage space of the media file, and the ID of the media type based on the defined structure of the clip file.

The procedure for analyzing client requirement information includes obtaining and analyzing the splitting time requirements and the clip placement strategy.

The clip placement strategy includes the option of data placement strategy, the hot level of the source video and the algorithm for allocating clips to storage server nodes.

The streaming media file analyzing and splitting task list producing procedures capture the clip file placement requirements defined by clients. Meanwhile, the media source file is analyzed to find the space and time deviation of each clip file and the range of serial number of the network packet. Based on this analysis, the splitting task list is produced.

The procedure for splitting the source video first reads the Index file to get the number of clips, and then creates several threads according to this quantity. After this, it reads the Index file to get the play task list, and sends each item in the list to relevant threads so that the splitting task can be created. For each splitting task, locate it to the defined location in the source video file to find pack mark. Then read the data unit when meeting this mark, and according to the description of network streaming media packet defining module, cut the data unit into several packages of network streaming media and write the data unit in a relevant clip file. This process is repeated until all the relevant data units are finished.

Overall, this invention comprehensively uses the analyzing technology for the standard media formats, the splitting technology for media streams, and real-time transmission protocol realization technology for media streams. It has the advantages of the traditional methods upon time and space and effectively uses the power of the cluster systems. The detailed characteristics of the invention are as follows:

1) High Generality

Theoretically, the system can support all the current media forms, and it does not depend on some specific media form. Although different media forms have different coding standards and storage forms, they have a same character. That is, they organize the media data upon the time index and are stored in the medium. This invention designs an overlay packet structure to packing the different media data.

2) High Availability

The storage system for the split-distributed media data issued in the invention is stable and reliable. It exchanges with the read and write interface in the upper layer of the video server with the sole form standard. In this way, the file W/R interface becomes simple and clear, the fault rate of the whole server is obviously decreased and the reliability of the whole server is increased.

3) High Efficiency

The split distributed storage technology makes video servers highly efficient. Before all the films enter into the storage system, they must accept the file split process of this invention. The split files are stored in several nodes in this split distributed way. The file split process is highly efficient and stable and increased speed can be guaranteed.

4) Significantly Increase the Quality of Clustered Video Servers

Through files split, the invention provides the single standard structure for all the stored media files and increases the efficiency of the media data. During the course of reading the files to sending them to the network of the media data, the times of transaction caching decreases ⅓, and therefore saves the system resources of the server nodes. Meanwhile, the size of data packets is almost the same, and the network bandwidth can be used rationally. There will not be sharp changes of bandwidth use so that the network resources are not wasted.

5) Benefit for the Realization of the Distributed Record Function of the Video Server As the interactive server, the video must have record function. This function is widely used for remote education, live report and so on. The technical difficulty to realize the distributed record function is how to store the recorded media data in several distributed nodes, while supporting the real-time command of the clients online. The sole standard form of media files designed in the invention is beneficial in the distributed storage of the data distributed random visit. Accordingly, it can overcome the above difficulties of the distributed record function.

6) Benefit for the Design of Client Player for Media Streaming Service.

The serious difficulty for designing the client player of streaming media is in how to organize the network streaming media packets. There are several streams in the media packet, so organizing the messages, and synchronizing several streams after receiving data in the client present technical difficulties. The structure of the streaming media network packet in the invention saves the synchronization process. Accordingly, it can combine several streams into a single stream for transmitting. So the organization of the packet is relatively simple.

According to another aspect of the present invention, a computer readable medium is provided, encoded with processing instructions for performing a method of splitting and allocating streaming media source files, the method including: defining a structure of a network packet, a structure of a distributed control file, and a structure of a clip file; analyzing information of streaming media source files, and processing a client's requirement to obtain a splitting requirement of the streaming media source files into clip files; defining a split files placement strategy and analyzing the clip file allocating requirements, according to the client's requirements; analyzing the streaming media source files to construct a splitting task list and relevant control files, according to the clients requirements; creating several threads to split the streaming media source files, wherein each thread is responsible for splitting a streaming media source file; and distributing the clip files to relevant storage server nodes, according to the split files placement strategy.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 illustrates the structure of the network data message for media streaming service;

FIG. 4 illustrates the Index files structure;

FIG. 5 illustrates the SDP files structure;

FIG. 6 illustrates the clip files structure;

FIG. 7 illustrates the data structure of the header information data for clip files;

FIG. 8 illustrates the data structure of the information header for media streams;

FIG. 9 illustrates the data structure of the media stream package in clip files;

FIG. 11 illustrates the data structure of the splitting task list;

DETAILED DESCRIPTION OF THE PREFERRED EMBODIMENTS

Figure 1:
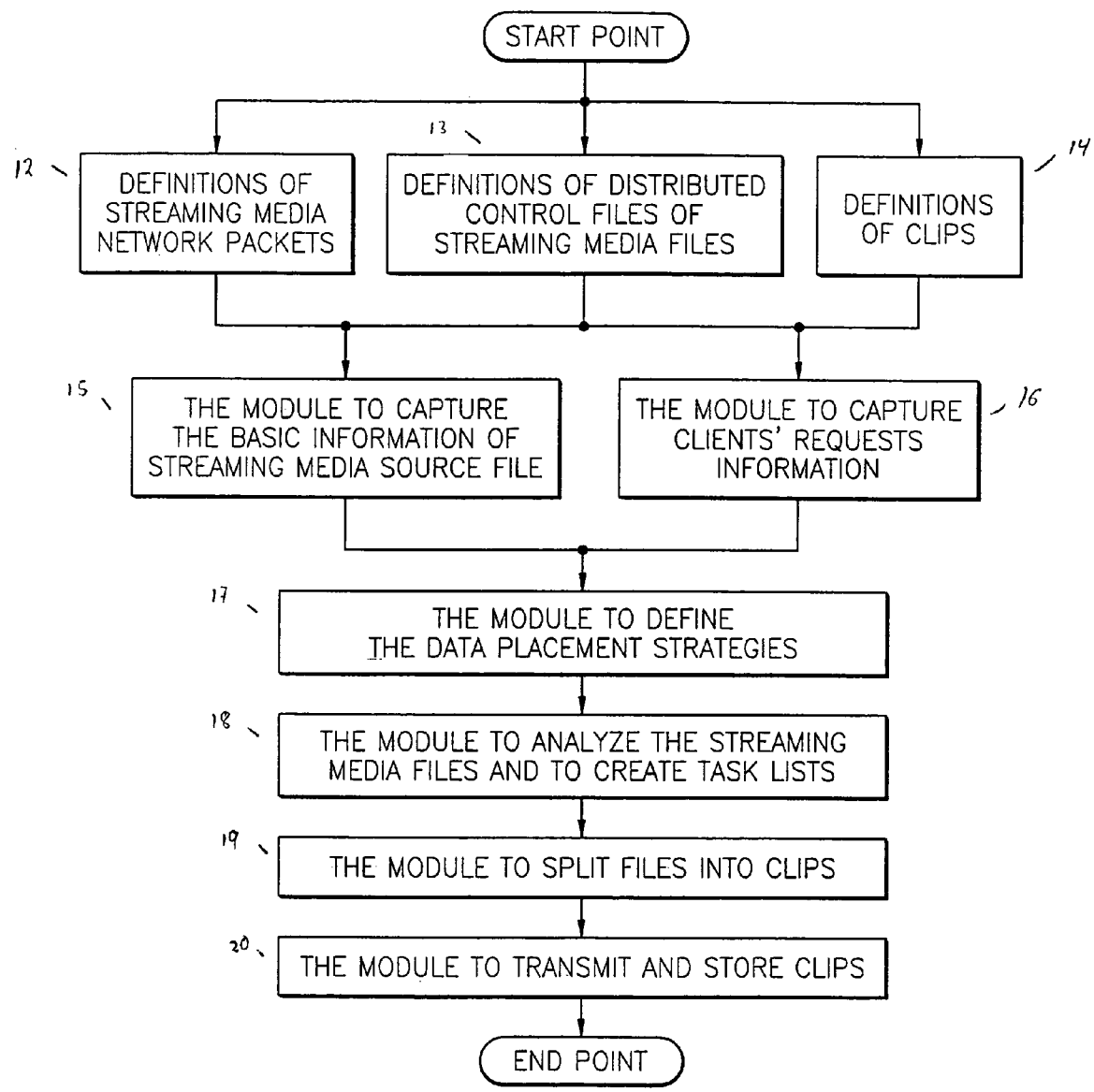
FIG. 1 illustrates a flowchart of the process of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a flowchart of the process of the invention. The system first defines the necessary information like split file structure, streaming media network packet structure 12, distributed control file structure of media data 13, definition of clips 14, and split distributed placement strategy. Then the streaming media file information capture module captures the basic information of the source files 15, captures the client's requests information 16, and prepares for the following split. The system then defines the data placement strategy 17, analyzes the streaming media file to produce splitting task list and process the task list 18, splits the files into clips 19, and transmits and stores the clips 20.

According to the flowchart of the novel media source file splitting scheme, a detailed description of media source files splitting process is described below.

The media source files splitting process first uses a stream media network message defining procedure to define the network messages. Based on the network packet structure, the streaming media distributed control file defining procedure and split file defining procedure are simultaneously processed defining the structure of the media disconnected control information files and the whole structure of the split files. Then, a media source file information capture module is used to get the basic information of the media source files in preparation for the following work. Meanwhile, the basic split requests of clients are accepted. The requests of clients are chosen according to some key parameters. There are two ways. One is that the clients can define how many clip files according to the quantity of splitting. The other is to regulate the playing time of the clip time to obtain the whole playing time of the media files. Thereafter, the process provides the clip file placement strategies defining procedure to get the placement requests of clip files defined by the clients, and processes the streaming media files analyzing procedure and splitting task lists producing procedure to obtain the splitting task and relevant control information files.

Next, the split files placement strategy defining procedure is executed to obtain the split files placement request defined by clients. Then the streaming media files analyze and splitting task list procedures are executed to get the splitting task list and relevant control information files.

Then the splitting task process procedure is executed. Several threads are created. Each thread executes a splitting task. This splitting task first reads the information in the splitting task data structure. Then opens the files and locates the space deviation place referred in the splitting task structure. Then the pack of media data is read. Accordingly, in the streaming media network packet structure defining module, several streaming media network packets will be produced. This procedure is also called RTP packet, which repeats the procedure until all the relevant packs are read. Then the split files are produced.

Finally, the split transmission storage procedure is executed. Each split file will be stored in the storage node of a relevant cluster upon meeting the requirement of split files placement strategy. So a splitting task is completed. In this splitting task process, the complete percentage of splitting is detected and shown to the client. And the dispatch time information is record so that the client can judge if the procedure is successful or not.

Figure 2:
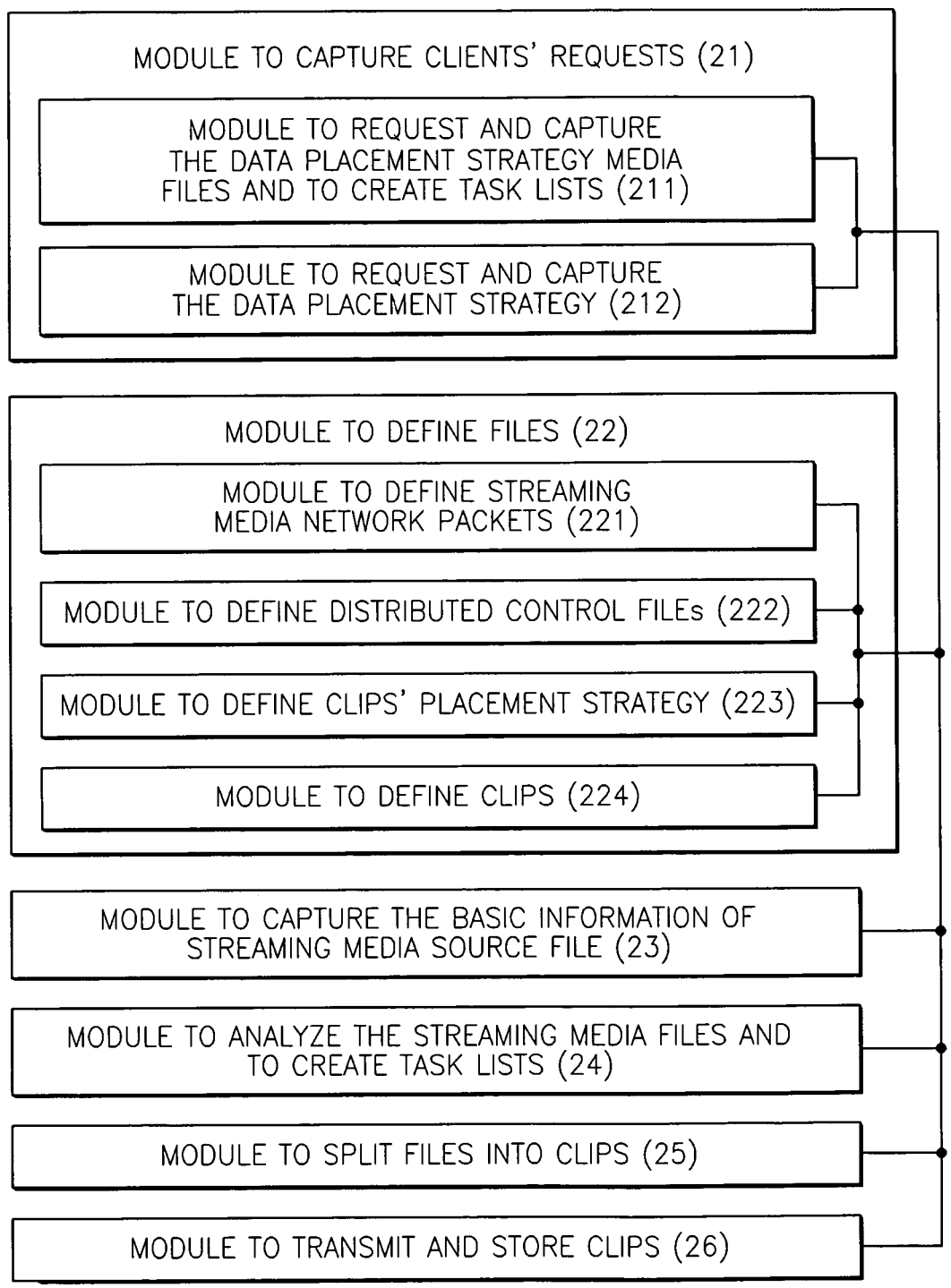
FIG. 2 illustrates an apparatus for performing the method of the present invention.

FIG. 2 illustrates an apparatus for performing the method of the present invention. The apparatus includes various modules including a module to capture client's requests 21, module to define files 22, module to capture the basic information of streaming media source file 23, module to analyze the streaming media files and to create task lists 24, a module to split files into clips 25, and a module to transmit and store clips 26. The module to capture client's requests, includes a module to request and capture the data placement strategy media files and to create a task lists 211, and a module to request and capture the data placement strategy 212. The module to define files 22 includes a module to define streaming media network packets 221, a module to define distributed control files 222, a module to define clips placement strategy 223 and a module to define clips 224.

The Module of Defining Streaming Media Network Packets

This procedure defines the structure of streaming network packet. In this system, the basic structure of the streaming network packet complies with the detailed standard of streaming media protocol. There are several international standard protocols of streaming media in the field. RTSP (real-time stream protocol) is used for order interaction control between the client and server. RTP/RTCP (real-time transmission protocol and real-time control protocol) are used for regulating and controlling network streaming media packet. SDP (session description protocol) is used for describing the connection between client and server. This system defines the special form of the main part of streaming media packet complied with international RTP protocol. Referring to FIG. 3, a decoding unit is a data unit which can be received and decoded by a decoder. The space size of the unit is generally fixed. The size is marked as Decoding Unit Size. Take MPEG-1 as an example, the size is about 2000 bytes and varies according to different compressing ratios. The system fixes the size of the packet, marked as Packet_Rayload_Size. Now, the key point of the problem is to cut each decoding unit into several packets. Obviously, the size of most packets still relies on the regulated fix size of packets. The size of the remaining packets depends on the size of the remaining data after the decoding unit is cut. Because the decoding unit has a fixed size, the packet is fixed too.

After the decoding unit is cut, it should be organized in the client. This procedure provides information necessary to guarantee that RTP standard protocol regulates the header of the protocol packet to have a time stamp, a serial number and a media mark. The procedure regulates that several RTP packets in the same decoding unit have the same time stamp, but the serial number should be increased progressively according to the original data moving. Refer to FIG. 3. The relevant packet can be easily organized to a complete decoding unit to playback.

Streaming Media Distributed Control Files Defining Procedure

A film source file will be cut into several split files and stored in several nodes. When a client requests to play some part of the film, guaranteeing that the video server dispatch all splits of the film without omitting any part is very important. This requires the storage system to provide efficient film split control information.

In this procedure, the basic information such as playing length serial number, storage location, needed bandwidth will be retrieved in a fixed way. The system regulates that the playing of each split is a basic playing task. Therefore, in the playing of a complete film, there will be a playing task list. The basic playing task list is read to the memory by the video server, then the dispatch can be realized correctly.

FIG. 4 illustrates the structure of the Index file. There are two distributed control files involved in this structure. One is the Index file, the other is the SDP file. The Index file is constituted by a playing task list, film resource file name, film resource space size, film resource time length, and film resource split quantity and film resource hot spot. The playing task list includes all of the playing tasks. Each playing task is constituted by the start time, finish time, start serial number, finish serial number and IP address of the node machine of the split file of the task.

FIG. 5 illustrates the structure of the SDP information file. The SDP information file is used to describe the basic information of the film resource and preparation information before the decoding of the client. The SDP information file is constituted by media type number, the quantity of the media streams in the film resource, the time length of the film source and the only mark of the client session.

The module of Clips Definitions

The key file of this procedure is the split file. The structure of the split file has an individual standard. According to this standard, the split process module of the system can cut and match the files with any media forms correctly, so that the system can operate without specific media form.

According to the design of this invention, the split file is constituted by the following parts:

1) Split file header
2) Message header of the media stream
3) Packet of the media stream Among the above parts, 2) and 3) emerge in pairs. If there are two streams in this split file, it includes two pairs of 2) and 3). The logic structure of the split files is described in FIG. 6.

The detailed structures of these three parts are as follows.

1) Split File Header

FIG. 7 illustrates the data structure of the header information data for clip files. The split file header describes the basic information of the split. It is constituted by the serial number, the time length, the quantity of the media streams, the average network bandwidth and the version number of the split. The average network bandwidth is used to estimate the utilization rate of the network bandwidth after the video server is powered on, so that the bandwidth can be distributed.

2) Message Header of the Media Stream

FIG. 8 illustrates the data structure of the information header for media streams. The message header of the media stream describes the basic information of the media stream. The media stream refers to the video stream, audio stream or system stream. The video stream with a different coding standard is referred to as a different media stream. This part is constituted by the following information: mark of the media stream (used to distinguish the decoder), playback time length of the media stream, the compressing ratio of the media stream and the data start location (to provide the location of the media data for the reading interface).

3) Packets of Streaming Media Data

FIG. 9 illustrates the data structure of the media stream package in clip files. In the definition module of streaming data packet, the structure of the streaming media packet has been described in detail. FIG. 3 shows that one sequence number is an unsigned integer. Because the sequence number is in a limited range, it is possible that the value of the sequence number reverses. The value of the time stamp is an unsigned integer with 32 bits, and the time stamp is the product of the time and the bit rate of the media stream. When there is a request with random accessing operations, it will fail since the values of the sequence numbers and time stamps have the possibility of reversing. It is very necessary that the packets of streaming media be encapsulated, including the IDs of media streams, the packet sequence number and the real playing back point (count from zero). With the help of these three items, it is very easy to randomly access the streaming media data.

The Module of Getting the Basic Information from Source Media Files

All data structures are defined in the method. The objective of the module is to capture the basic information of the source media files, including space size, the number of media streams, the time length of each media stream, the media format ID of each media stream and the total time length of the source file. Since the specifics of each media stream are different, it is necessary to program a different module for different media streams.

The MPEG-1 system stream will be described as an example of how to capture the basic information of source media files. The procedure is as follows:

In a first operation, the file structure of the MPEG-1 media format has a strict definition. There is a system header in the source media file. The media format ID, the compression ratio and other information can be captured from the system header.

In a second operation, the media data should be analyzed. The media data of MPEG-1 are organized into many Packs. The size of each pack is fixed. Hence it is an individual decoding unit involved above. Each pack has a fixed message header, which records the playtime of the pack. Therefore from the beginning to the end, until the header of the last pack is analyzed, the whole playtime of the source media file can be captured.

With these two operations, the work to capture the information of media source files has been accomplished.

The Module to Define the Clip Files Placement Strategy

The clip file should be stored on all the storage nodes according to some rules and strategies. When the placement strategy is being designed, the high visiting frequency of the hot films, the load balance of each storage node and the backup of the system should be considered. The module includes a data placement strategy option, hot level options of films and the data placement algorithm.

The system provides a data placement strategy with client control. Firstly, a typical data placement strategy is provided: round robin; secondly, hot level options of films are given by clients and can be used to decide the replicas of each clip of one film. The system can finish the distributed storage of all clip files of films according to the above information provided by clients.

The hot level option is defined as Hot. Data structures are defined as follows:

---
Hot_Level {
First_Level; // level 1. All the clips have no replicas;
Second_Level; // level 2. Each clip of the media file has a replica.
Third_Level; // level 3. Each clip of the media file has two replicas.
Top_Level; //the top level. Each clip of the media file has three replicas.
};
---

The algorithm of round robin strategy is as the follows:
Given N storage nodes: Host[I], I=1, 2, . . . N;
All the M clips of one film are: Clips[I], I=1, 2, . . . M.
The first replicas set is defined: Clip_One[I], I=1, 2, . . . M;
The second replicas set is Clip_two[I], I=1, 2, . . . M;
The third replicas set is Clip_three[I], I=1, 2, . . . M.
When the hot level option is First_Level,
The storage location of the I-th clip is Host[a]: Host[a]=I mod N;
When the hot level parameter is Second_Level,
The storage location of the I-th clip is Host[a]: Host[a]=I mod N;
The storage location of the J-th replica clip in the first replicas set is Host[b]:

Host[b]=(J mod N)+1;

When the hot level parameter is Third_Level,
The storage location of the I-th clip is Host[a]: Host[a]=I mod N;
The storage location of the J-th replica clip in the first replicas set is Host[b]:Host[b]=(J mod N)+1;

The storage location of the K-th replica clip in the second replicas set is

Host[c]:Host[c]=(K mod N)+2;

When the hot level parameter is Top_Level,
The storage location of the I-th clip is Host[a]: Host[a]=I mod N;
The storage location of the J-th replica clip in the first replicas set is
Host[b]: Host[b]=(J mod N)+1;
The storage location of the K-th replica clip in the second replicas set is Host[c]:Host[c]=(K mod N)+2;

The storage location of the L-th replica clip in the third replicas set is

Host[d]:Host[d]=(L mod N)+3;

The Module to Analyze the Streaming Media Files and to Create Task Lists

The module of analyzing the Streaming media files is responsible for capturing information of files and is ready to create the task lists of splitting files into clips. The data placement strategy can be parsed from the requests of clients. Meanwhile the media source files should be analyzed to find the space interval points, time interval points and the sequence number range of network packets of each clip. Then the task of how to split files into clips can be created. The procedure is described as follows:

A first operation is performed to search the defined PACK mark according to the captured basic information of media files.

In a second operation, the data of the PACK units should be processed to analyze the time stamp and the sequence number.

In a third operation, the time stamp should be compared with the end time of each clip file. If equal, a clip file list item can be written into the Index files. Otherwise, the next PACK data unit will be handled again.

Figure 10:
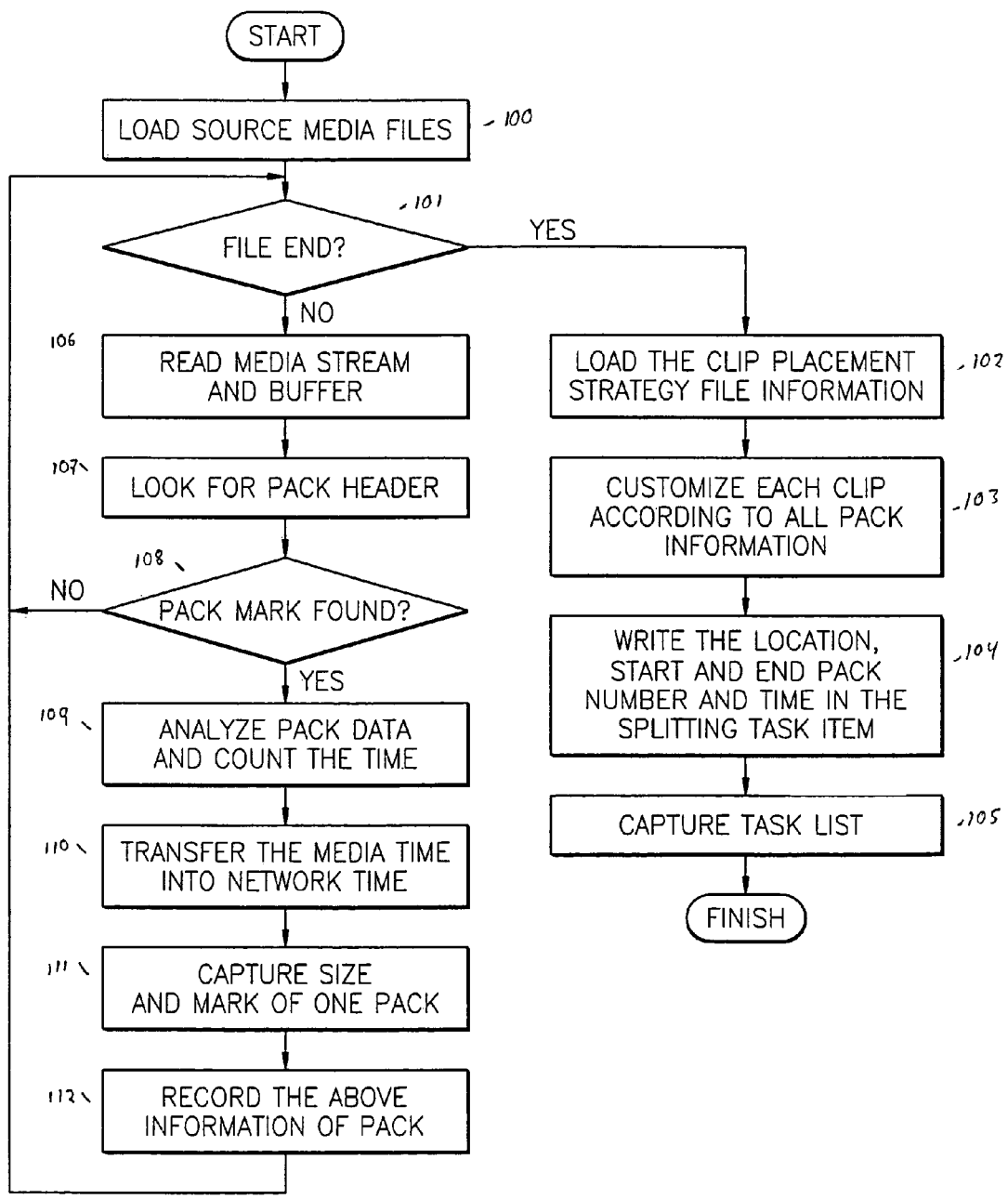
FIG. 10 illustrates the process framework for analyzing the media files and producing the splitting task list.

FIG. 10 illustrates the process for analyzing the media files and producing the splitting task. In a first operation, the load source media files are loaded 100, thereafter, a determination is made as to whether the file ends 101. If the file ends, the clip placement strategy file information is loaded 102, and each clip is customized according to all the pack information 103. At a later operation, a location, start and end pack number and time in the splitting task item are written 104, the capture task list is created 105 and the process ends. If the file has not ended, media stream and buffer information are read 106, and a PACK header information is searched for 107. Thereafter, a determination is made as to whether a PACK mark is found or not 108. If no PACK mark is found, the process returns to operation 101. If a PACK mark is found, the PACK data is analyzed and the time is counted 109. Thereafter, the media time is transferred into the network time 110, and the size and mark of one pack are captured 111. Finally, the above information of the PACK is recorded 112.

FIG. 11 illustrates the data structure of the splitting task list. From the figure, the task lists record the basic information of each clip file, including the space offset in the source files, start time point, end time point and the flag whether the process is successful or not.

The Module to Split Files into Clips

In this procedure, multi-threads are created to split the source files into clips according to the above task lists. The procedure is described as follows:

In a first operation, the procedure will read the Index files to get the number of clips of one source file and then create multiple threads according to the clips number.

In a second operation, the procedure will continue to read the Index files to get the task lists, and transmit each item in the lists to relevant threads to establish each splitting task.

For any splitting task, a third operation will analyze the source files and locate the location of PACK marks. When meeting the mark, the PACK will be read out and be split into several network packets according to the module to define the data structures of network packets. Then all network packets will be written into relevant clip files.

In a fourth operation, the procedure will repeat the process of the third operation until all of the corresponding data units are handled over, and all splitting work has been done.

In the process of each splitting task, the percentage of the splitting work will be showed to the clients. And the scheduling time information will be recorded for the clients to judge it as successful or not.

Figure 12:
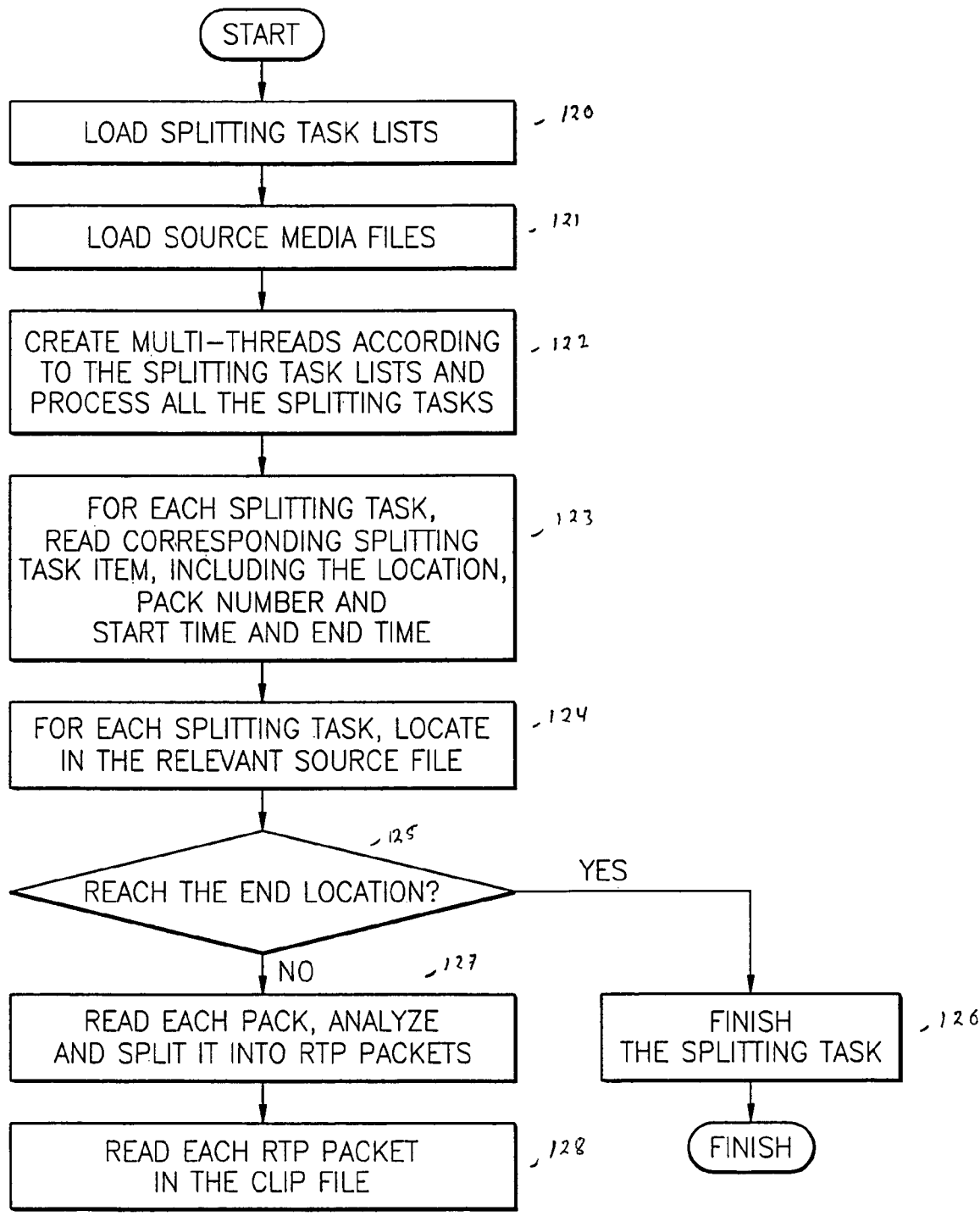
FIG. 12 illustrates the processing framework for executing splitting tasks.

FIG. 12 illustrates the processing framework for executing the splitting tasks. In a first operation, the splitting task lists are loaded 120, thereafter the source media files are loaded 121, and a multi-threads are created according to the splitting task lists and all the splitting tasks are processed 122. For each splitting task, a corresponding splitting task item is read, including the location pack number and a start time and end time 123. For each splitting task, located in the relevant source file 124. Thereafter, a determination is made at to whether an end location has been reached 125. If no end location has been reached, reach pack is read, analyzed and split into RTP packets 127, and each RTP packet in the clip file is read 128. If it is determined that the end location has been reached, the splitting task ends 126.

The Module to Transmit and Store Clips

This module is used to store the clips created by the above modules on the corresponding storage nodes.

First, the network addresses of the storage nodes are captured according to the location requests defined in data placement strategy.

Second, the captured clips are transmitted and stored.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of video splitting and allocation for clustered video servers, the method comprising:
defining a structure of a network packet, a structure of a distributed control file, and a structure of a clip file;
analyzing information of streaming media source files, and processing a client's requirements to obtain a splitting requirement of the streaming media source files into clip files, the splitting requirement being the manner in which the media source files are split, the splitting requirement being one of clip placement based on clip time and clip placement based on quantity of clip splitting;
defining a split files placement strategy and analyzing a clip file allocating requirements, according to the client's requirements;
analyzing the streaming media source files to construct a splitting task list and relevant control files, according to the client's requirements;
creating several threads to split the streaming media source files, wherein each thread is responsible for splitting a streaming media source file; and
distributing the clip files to relevant storage server nodes, according to the split files placement strategy,
wherein the splitting task list is produced by analyzing the media source files to find a space and time deviation of each clip file and a range of a serial number of the network packet.

2. The method of claim 1, wherein the streaming media source files include an Index file and a Session Description Protocol (SDP) file.

3. The method of claim 2, wherein the Index File includes a transmitting task list, a file name of a video source, a storage space of the video source, a time length of the video source, a clip file number of the video source, and a hot spot of the video source.

4. The method of claim 2, wherein the SDP file includes a media type, a number of streams included in a video source, a time length of the video source and an ID of a streaming session.

5. The method of claim 1, wherein the structure of the clip files includes a header of the clip files, an information header of media streams, and the network packet of a media streaming service.

6. The method of claim 1, wherein the analyzing of the streaming media source files includes, analyzing a number of logical time units in the media source files, and obtaining time information of a header and a number of media stream for each logic time unit.

7. The method of claim 6, further comprising repeating the analysis until all the logic time units are finished and obtaining a total playback duration, a storage space of the media source files, and an ID of the media source files based on the structure of the clip file.

8. The method of claim 2, wherein the splitting of the media source file comprises reading the Index file to obtain a number of clips, and creating several threads according to the obtained number.

9. The method of claim 8, further comprising reading the Index file and obtaining a play task list including several items, and sending each item in the play task list to relevant threads creating a splitting task.

10. The method of claim 1, wherein the client's requirements include obtaining and analyzing splitting time requirements and clip placement strategy.

11. The method of claim 10, wherein the clip placement strategy includes a data placement strategy, a hot level of a source video, and an algorithm for allocating clips to the relevant storage server nodes.

12. The method of claim 1, wherein the structure of the network packet complies with a streaming media data message in international real-time transmission protocol, including media type head, serial number, time stamp, synchronous signal, and main media data.

13. A non-transitory computer readable medium encoded with processing instructions for performing a method of splitting and allocating streaming media source files, the method comprising:
defining a structure of a network packet, a structure of a distributed control file, and a structure of a clip file;
analyzing information of streaming media source files, and processing a client's requirements to obtain a splitting requirement of the streaming media source files into clip files, the splitting requirement being the manner in which the media source files are split, the splitting requirement being one of clip placement based on clip time and clip placement based on quantity of clip splitting;
defining a split files placement strategy and analyzing a clip file allocating requirements, according to the client's requirements;
analyzing the streaming media source files to construct a splitting task list and relevant control files, according to the client's requirements;
creating several threads to split the streaming media source files, wherein each thread is responsible for splitting a streaming media source file; and
distributing the clip files to relevant storage server nodes, according to the split files placement strategy,
wherein the splitting task list is produced by analyzing the media source files to find a space and time deviation of each clip file and a range of a serial number of the network packet.

14. The non-transitory computer readable medium of claim 13, wherein the streaming media source files include an Index file and a Session Description Protocol (SDP) file.

15. The non-transitory computer readable medium of claim 14, wherein the Index File includes a transmitting task list, a file name of a video source, a storage space of the video source, a time length of the video source, a clip file number of the video source, and a hot spot of the video source.

16. The non-transitory computer readable medium of claim 14, wherein the SDP file includes a media type, a number of streams included in a video source, a time length of the video source and an ID of a streaming session.

17. The non-transitory computer readable medium of claim 13, wherein the structure of the clip files includes a header of the clip files, an information header of media streams, and the network packet of a media streaming service.

18. The non-transitory computer readable medium of claim 13, wherein the analyzing of the streaming media source files includes, analyzing a number of logical time units in the media source files, and obtaining time information of a header and a number of media stream for each logic time unit.

19. The non-transitory computer readable medium of claim 18, further comprising repeating the analysis until all the logic time units are finished and obtaining a total playback duration, a storage space of the media source files, and an ID of the media source files based on the structure of the clip file.

20. The non-transitory computer readable medium of claim 14, wherein the splitting of the media source file comprises reading the Index file to obtain a number of clips, and creating several threads according to the obtained number.

21. The non-transitory computer readable medium of claim 20, further comprising reading the Index file and obtaining a play task list including several items, and sending each item in the play task list to relevant threads creating a splitting task.

22. The non-transitory computer readable medium of claim 13, wherein the client's requirements include obtaining and analyzing splitting time requirements and clip placement strategy.

23. The non-transitory computer readable medium of claim 22, wherein the clip placement strategy includes a data placement strategy, a hot level of a source video, and an algorithm for allocating clips to the relevant storage server nodes.

24. The non-transitory computer readable medium of claim 13, wherein the structure of the network packet complies with a streaming media data message in international real-time transmission protocol, including media type head, serial number, time stamp, synchronous signal, and main media data.

25. A method of splitting and allocating streaming media source files, the method comprising:
    capturing information of the streaming media source files;
    capturing client's requests information;
    obtaining a splitting requirement of the streaming media source files into clip files based on the client's requests information, the splitting requirement being the manner in which the media source files are split, the splitting requirement being one of clip placement based on clip time and clip placement based on quantity of clip splitting;
    creating data placement strategies;
    analyzing the streaming media source files and creating task lists;
    splitting the streaming media source files into clips; and
    transmitting and storing the clips in the servers,
    wherein the task lists are created by analyzing the media source files to find a space and time deviation of each clip file and a range of a serial number of a network packet.

* * * * *